United States Patent [19]

Okimoto et al.

[11] Patent Number: 5,095,703
[45] Date of Patent: Mar. 17, 1992

[54] AIR AND FUEL SUPPLY CONTROL SYSTEMS FOR INTERNAL COMBUSTION ENGINES

[75] Inventors: Haruo Okimoto; Toshimichi Akagi; Seiji Tashima, all of Hiroshima, Japan

[73] Assignee: Mazda Motor Corporation, Hiroshima, Japan

[21] Appl. No.: 488,270

[22] Filed: Mar. 5, 1990

[30] Foreign Application Priority Data

Mar. 9, 1989 [JP] Japan .................................. 1-57286

[51] Int. Cl.$^5$ .............................................. F02B 37/12
[52] U.S. Cl. ...................................... 60/612; 60/601
[58] Field of Search ................ 60/612, 600, 601, 602, 60/603

[56] References Cited

U.S. PATENT DOCUMENTS

| | | | |
|---|---|---|---|
| 4,512,152 | 4/1985 | Asaba | 60/601 |
| 4,982,567 | 1/1991 | Mashimoto | 60/600 |

FOREIGN PATENT DOCUMENTS 246415 10/1988 Japan .................................. 60/612

*Primary Examiner*—Richard A. Bertsch
*Assistant Examiner*—Peter Koryinyk
*Attorney, Agent, or Firm*—Sixbey, Friedman, Leedom and Ferguson

[57] ABSTRACT

An air and fuel supply control system for an internal combustion engine comprises a plurality of superchargers including a turbosupercharger, an intake air cutoff valve operative selectively to be open and closed respectively for opening and closing one of separated intake passages in which a compressor of the turbosupercharger is disposed, an intake air relief valve operative selectively to be open and closed respectively for opening and closing a relief passage provided for detouring the compressor of the second supercharger, a cutoff valve controller operative to control the intake air cutoff valve to be closed so that the turbosupercharger is restrained from supercharging the engine and to be open so that the turbosupercharger works for supercharging the engine, a relief valve controller operative to control the intake air relief valve to be closed before the intake air cutoff valve is opened and to be open after the intake air cutoff valve is closed, an air flow sensor for detecting intake air mass flow passing through an intake passage from which the separated intake passages are branched, a fuel supply controller operative to control quantity of fuel supplied to the engine in accordance with a detection output obtained from the air flow sensor, and a fuel supply revising device operative to revise the quantity of fuel supplied to the engine when the intake air relief valve is caused to be open and closed selectively.

9 Claims, 9 Drawing Sheets

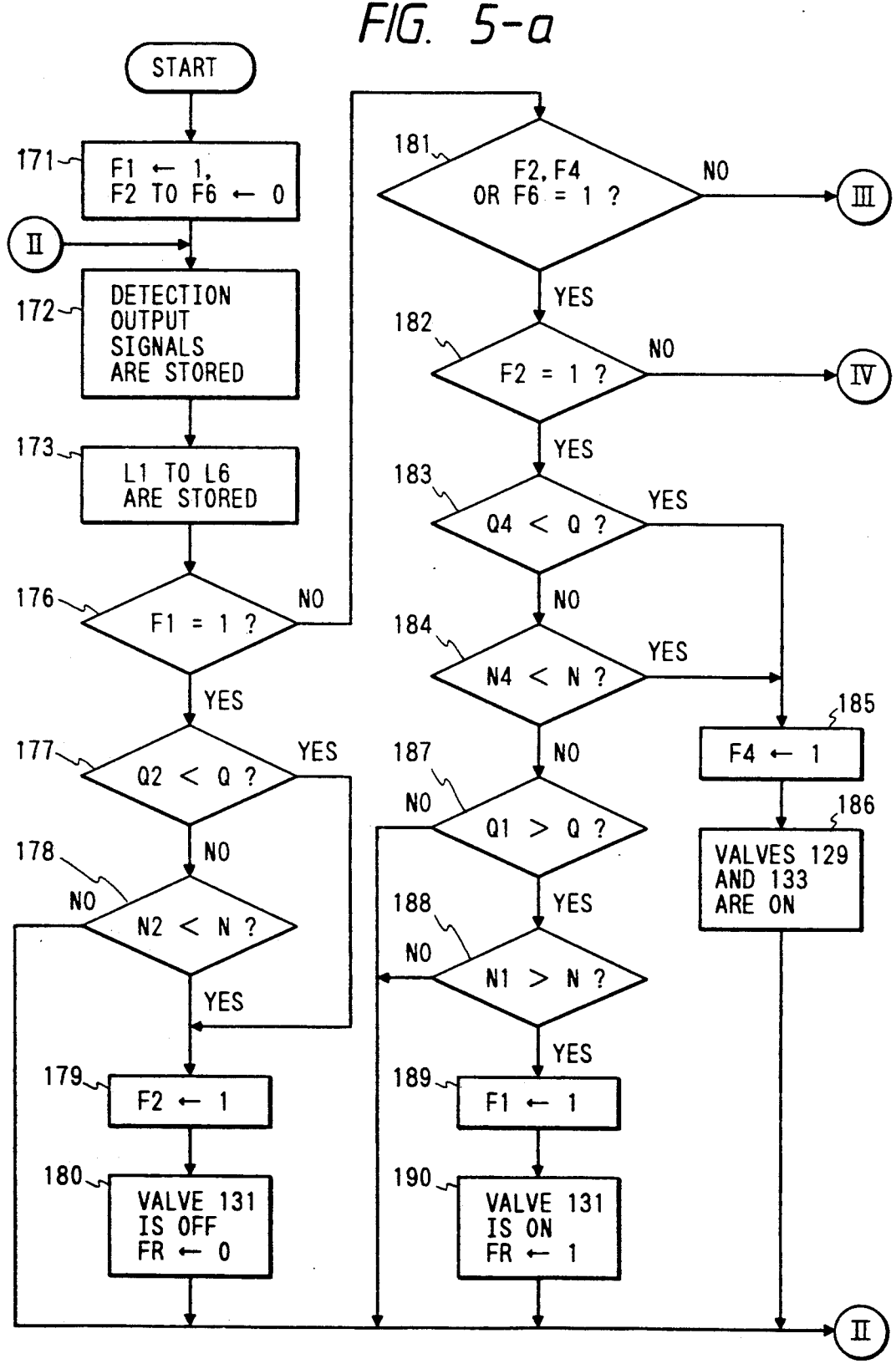

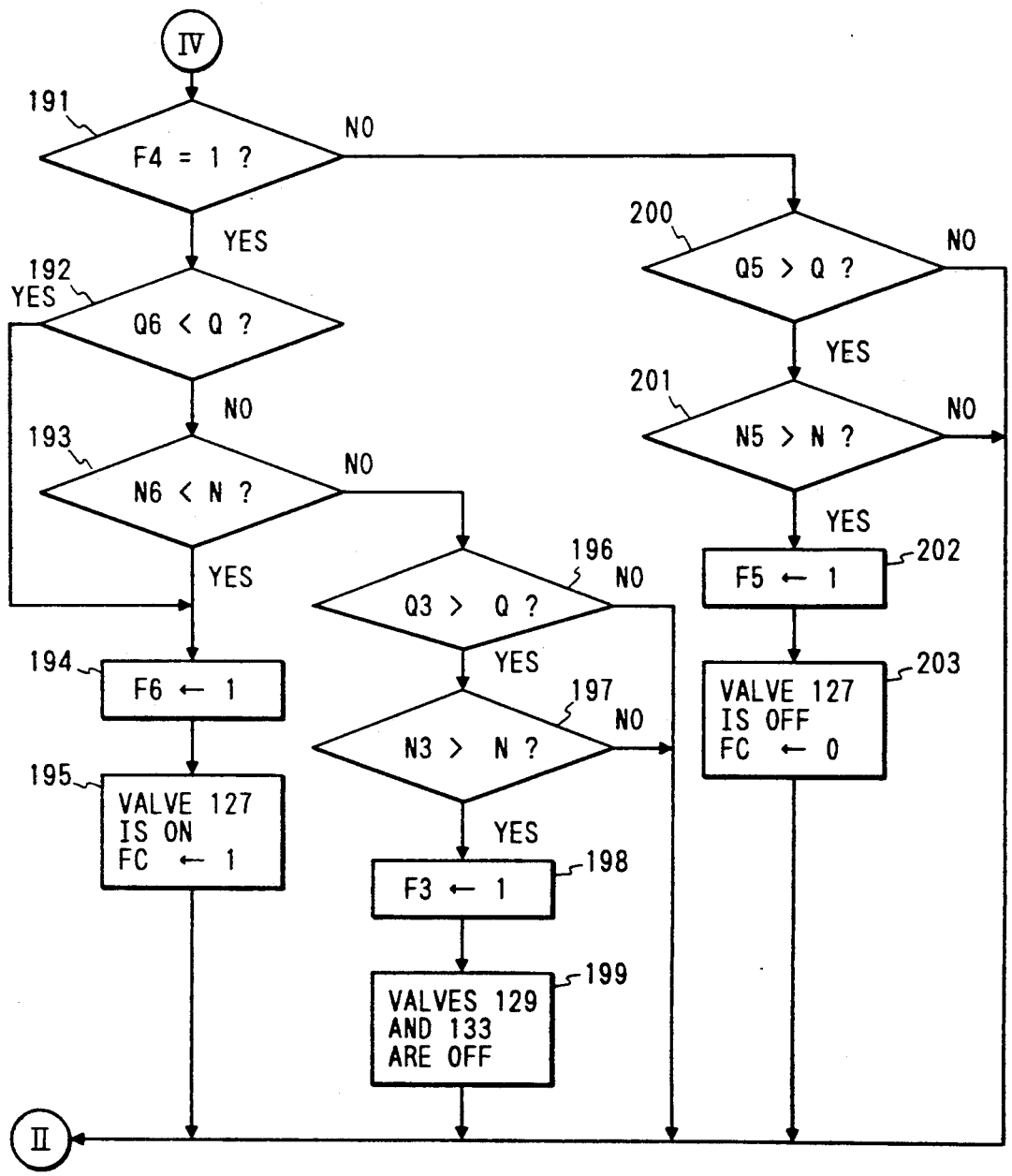
FIG. 5-b

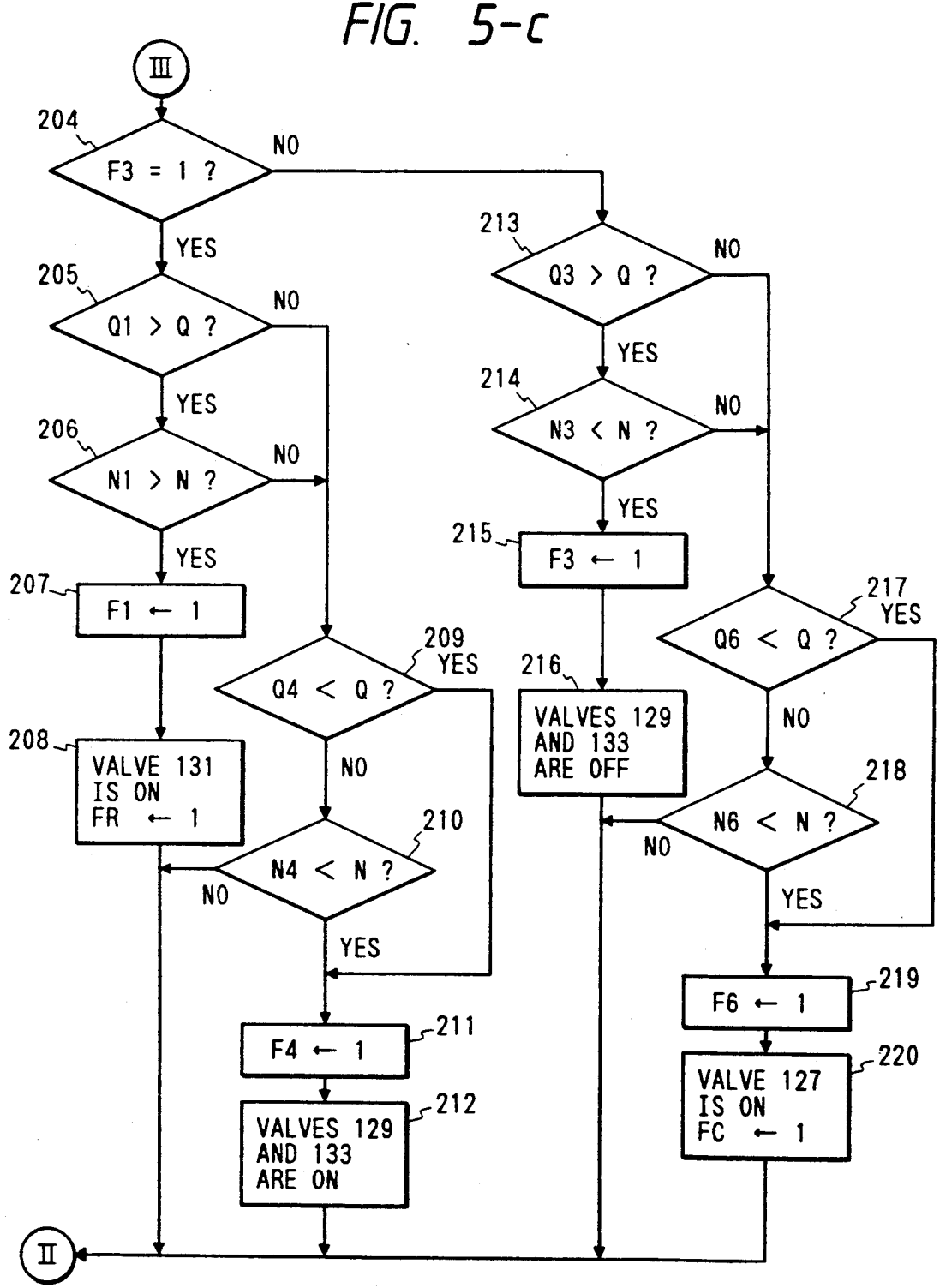
FIG. 5-c

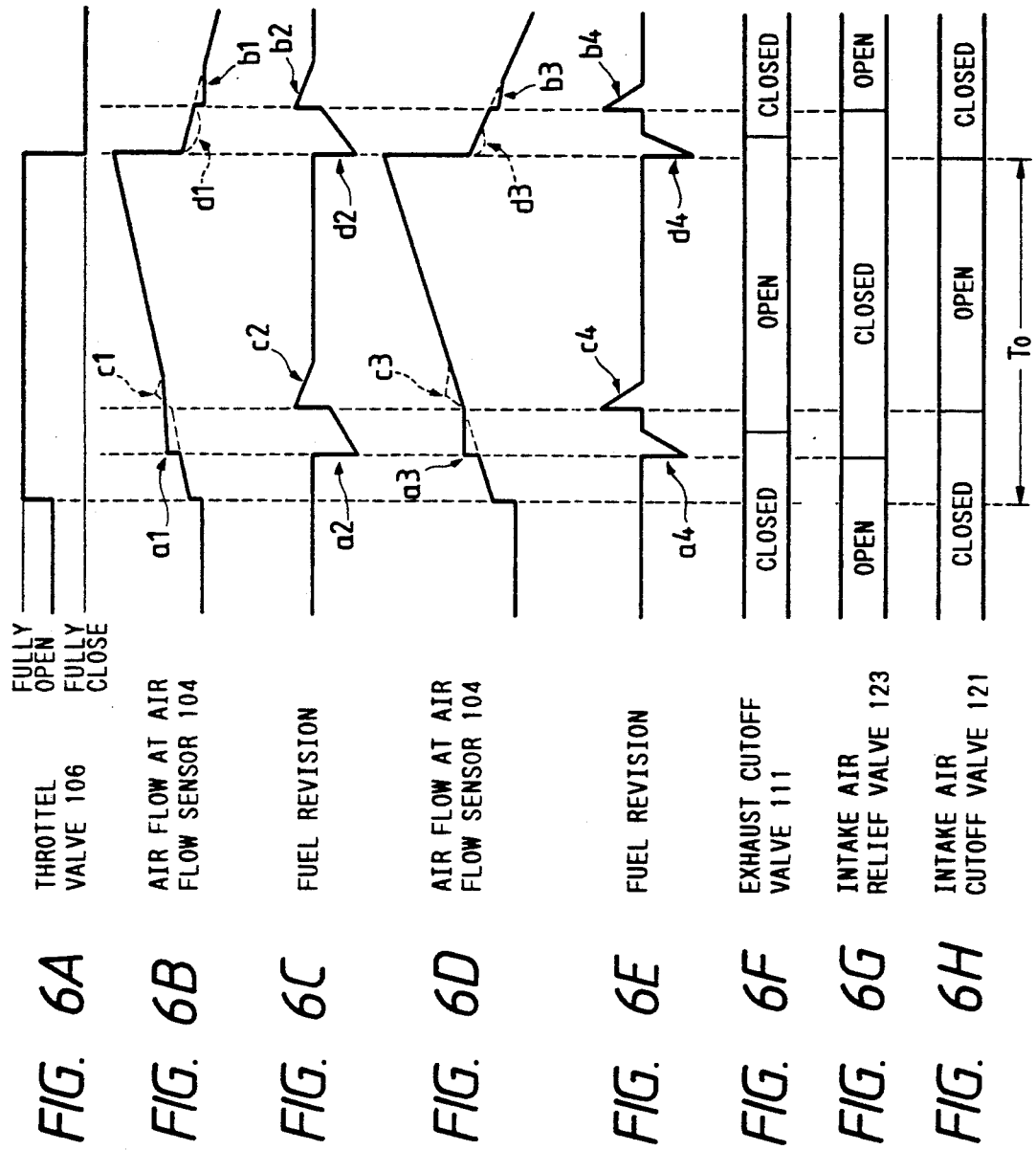

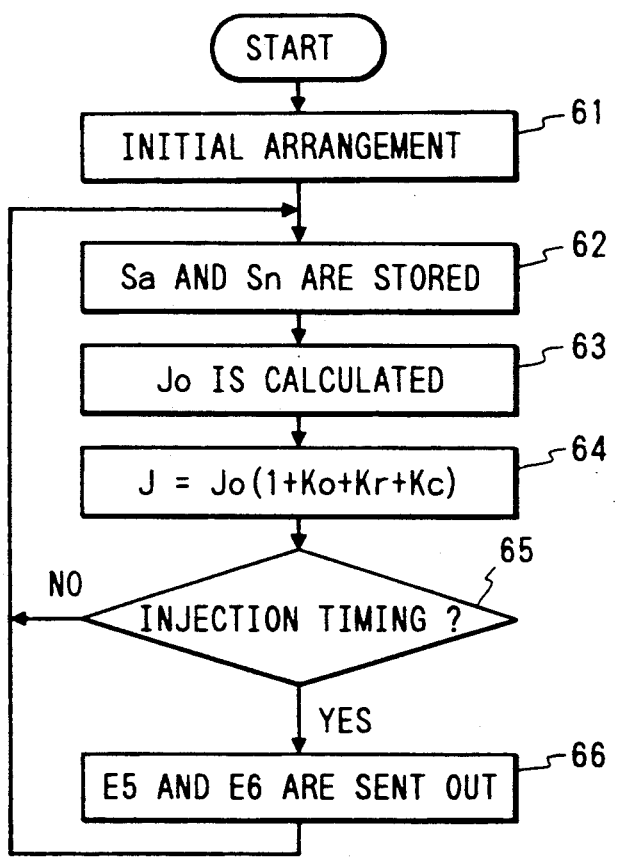

AIR AND FUEL SUPPLY CONTROL SYSTEMS FOR INTERNAL COMBUSTION ENGINES

BACKGROUND OF THE INVENTION

1. Field of the Invention

The present invention relates generally to air and fuel supply control systems for internal combustion engines, and more particularly, to a system for controlling air supply effected to an internal combustion engine by a plurality of superchargers accompanied with the internal combustion engine to be controlled to work sequentially and fuel supply effected to the internal combustion engine supercharged by one or more of the superchargers.

2. Description of the Prior Art

In the field of internal combustion engines employed in vehicles, there has been proposed a so-called sequentially controlled supercharging system in which a couple of turbosuperchargers of primary and secondary are provided for an internal combustion engine and so controlled that only the primary turbosupercharger works for supercharging the engine when intake air mass flow in an intake passage of the engine is relatively small and both the primary and the secondary turbosuperchargers work simultaneously for supercharging the engine when the intake air mass flow is relatively large, as disclosed in, for example, the Japanese patent applications published before examination under publication numbers 56-41417 and 59-160022. In such a system, an exhaust cutoff valve is disposed in a portion of an exhaust passage of the engine through which exhaust gas is applied to a turbine of the secondary turbosupercharger and an intake air cutoff valve is also disposed in a portion of the intake passage of the engine through which intake air compressed by a compressor of the secondary turbosupercharger is supplied to a combustion chamber of the engine, and each of the exhaust cutoff valve and the intake cutoff valve is controlled to be closed and open so as to cause the primary and secondary turbosuperchargers to work in the aforementioned manner.

In connection with the control in operation of each of the primary and secondary turbosuperchargers, it has been proposed to put the secondary turbosupercharger in a condition of preliminary rotation before the secondary turbosupercharger commences to work for supercharging the engine for the purpose of suppressing torque shock arising on the engine due to time lag in the starting characteristic of the secondary turbosupercharger. In such a case, it has been usual that the preliminary rotation of the secondary turbosupercharger is started by such a control as to open the exhaust cutoff valve for supplying the turbine of the secondary turbosupercharger with the exhaust gas under a condition in which the intake air cutoff valve is closed and an intake air relief valve which is provided in a bypass provided to the intake passage for detouring the compressor of the secondary turbosupercharger is opened after the intake air cutoff valve has been closed, and caused to proceed under a condition in which the intake air relief valve comes to be closed before the intake air cutoff valve comes to be open.

Accordingly, when the intake air relief valve is caused to be closed from open, the bypass passage is closed so that air flow which circulates from a portion of the intake passage downstream to the compressor of the secondary turbosupercharger through the bypass a location of the intake passage upstream to the compressor of the secondary turbosupercharger decreases and therefore air flow which is directed to the secondary turbosupercharger after having passed through an air flow meter provided in the intake passage increases. Consequently, intake air mass flow detected by the air flow meter increases to be larger than intake air mass flow practically supplied to the combustion chamber of the engine.

In the meantime, in a previously proposed fuel supply system employed in the engine equipped with the primary and secondary turbosuperchargers working in the manner mentioned above, quantity of fuel supplied to the combustion chamber of the engine is determined on the strength of a detection output of the air flow meter so as to be in proportion to the intake air mass flow detected by the air flow meter. This results in a disadvantage that the fuel supplied to the combustion chamber of the engine is caused to be in excess in relation to the air mass flow practically supplied to the engine so that an air to fuel ratio in the engine is undesirably changed when the intake air relief valve is closed.

Further, when the intake air relief valve is caused to be open from closed, the bypass passage is opened so that intake air having stayed at the portion of the intake passage downstream to the compressor of the secondary turbosupercharger flows through the bypass passage to the portion of the intake passage upstream to the compressor of the secondary turbosupercharger and therefore the air flow which is directed to the secondary turbosupercharger after having passed through the air flow meter decreases. Consequently, the intake air mass flow detected by the air flow meter decreases to be smaller than the intake air mass flow practically supplied to the combustion chamber of the engine.

In such an occasion also, quantity of fuel supplied to the combustion chamber of the engine is determined on the strength of a detection output of the air flow meter so as to be in proportion to the intake air mass flow detected by the air flow meter. This results in another disadvantage that the fuel supplied to the combustion chamber of the engine is caused to be deficient in relation to the air mass flow practically supplied to the engine so that an air to fuel ratio in the engine is undesirably changed when the intake air relief valve is opened.

OBJECTS AND SUMMARY OF THE INVENTION

Accordingly, it is an object of the present invention is to provide an air and fuel supply control system for an internal combustion engine provided with a plurality of superchargers including a turbosupercharger operative to work when intake air mass flow fed to the engine is to be relatively large, a valve arrangement including an intake air cutoff valve and an intake air relief valve for controlling intake air passing through the turbosupercharger, and a fuel control device operative to control quantity of fuel supplied to the engine in accordance with the intake air mass flow fed to the engine, which avoids the foregoing disadvantages and problems encountered with the prior art.

Another object of the present invention is to provide an air and fuel supply control system for an internal combustion engine provided with a plurality of superchargers including a turbosupercharger operative to work when intake air mass flow fed to the engine is to be relatively large, a valve arrangement including an intake air cutoff valve and an intake air relief valve for controlling intake air passing through the turbo-supercharger, and a fuel control device operative to control quantity of fuel supplied to the engine in accordance with the intake air mass flow fed to the engine, by which an air to fuel ratio is prevented from undesirably varying when the intake air relief valve is caused to be open from closed or closed from open.

A further object of the present invention is to provide an air and fuel supply control system for an internal combustion engine provided with a plurality of superchargers including a turbosupercharger operative to work when intake air mass flow fed to the engine is to be relatively large, a valve arrangement including an intake air cutoff valve and an intake air relief valve for controlling intake air passing through the turbosupercharger, and a fuel control device operative to control quantity of fuel supplied to the engine in accordance with the intake air mass flow fed to the engine, by which the quantity of fuel supplied to the engine is revised to decrease or increase when the intake air relief valve is caused to be open from closed or closed from open.

According to the present invention, there is provided an air and fuel supply control system for an internal combustion engine, which comprises a plurality of superchargers including at least a first supercharger and a second supercharger which is constituted as a turbosupercharger having a turbine disposed in one of separated exhaust passages extending from the engine and a compressor disposed in one of separated intake passages connected with the engine, an intake air cutoff valve operative selectively to be open and closed respectively for opening and closing the separated intake passage in which the compressor of the second supercharger is disposed, an intake air relief valve operative selectively to be open and closed respectively for opening and closing a relief passage provided to the separated intake passage in which the compressor of the second supercharger is disposed so as to detour the compressor of the second supercharger, a cutoff valve controller operative to cause the intake air cutoff valve to be closed so that the first supercharger works for supercharging the engine but the second supercharger is restrained from supercharging the engine when intake air mass flow fed to the engine is to be relatively small and to cause the intake air cutoff valve to be open so that both of the first and second superchargers work for supercharging the engine when the intake air mass flow fed to the engine is to be relatively large, a relief valve controller operative to cause the intake air relief valve to be closed from open before the intake air cutoff valve is caused to be open from closed and to be open from closed after the intake air cutoff valve is caused to be closed from open, an intake air mass flow detector disposed in an intake passage from which the separated intake passages are branched for detecting intake air mass flow passing through the intake passage, a fuel supply control device for controlling quantity of fuel supplied to the engine in accordance with a detection output obtained from the intake air mass flow detector, and a fuel supply revising device for revising the quantity of fuel supplied to the engine, which is controlled by the fuel supply control device, when the intake air relief valve is caused to be open and closed selectively.

In the air and fuel supply control system thus constituted in accordance with the present invention, when the intake air relief valve is controlled by the relief valve controller to be closed from open before the intake air cutoff valve is caused to be open from closed so as to cause the second supercharger to commence working in addition to the first supercharger or to be open from closed after the intake air cutoff valve is closed from open so as to cause the second supercharger to terminate working and therefore intake air mass flow practically fed to the engine is varied to be different from the intake air mass flow detected by the intake air mass flow detector, the quantity of fuel supplied to the engine, which is controlled by the fuel supply control device in accordance with the detection output obtained from the intake air mass flow detector, is revised by the fuel supply revising device to correspond to the intake air mass flow practically fed to the engine. In the concrete, when the intake air relief valve is caused to be closed from open and therefore the intake air mass flow detected by the intake air mass flow detector is varied to be larger than the intake air mass flow practically fed to the engine, the quantity of fuel supplied to the engine is decreased to be in proportion to the intake air mass flow practically fed to the engine and, on the other hand, when the intake air relief valve is caused to be open from closed and therefore the intake air mass flow detected by the intake air mass flow detector is varied to be smaller than the intake air mass flow practically fed to the engine, the quantity of fuel supplied to the engine is increased to be in proportion to the intake air mass flow practically fed to the engine.

With such revisions of the quantity of fuel supplied to the engine by the fuel supply revising device, the fuel supplied to the engine is prevented from being in excess or being insufficient in relation to the air mass flow practically supplied to the engine and consequently the fuel ratio in the engine is prevented from undesirably varying when the intake air relief valve is caused to be closed from open or open from closed.

The above, and other objects, features and advantages of the present invention will become apparent from the following detailed description which is to be read in conjunction with the accompanying drawings.

BRIEF DESCRIPTION OF THE DRAWINGS

FIGS. 5-a, 5-b and 5-c show a flow chart used for explaining the operation of the embodiment shown in FIG. 2.

FIGS. 6A to 6H are time charts used for explaining the operation of the embodiment shown in FIG. 2; and FIGS. 7 and 8 show flow charts used for explaining a fuel supply control carried out in the embodiment shown in FIG. 2.

DESCRIPTION OF THE PREFERRED EMBODIMENT

Figure 1:
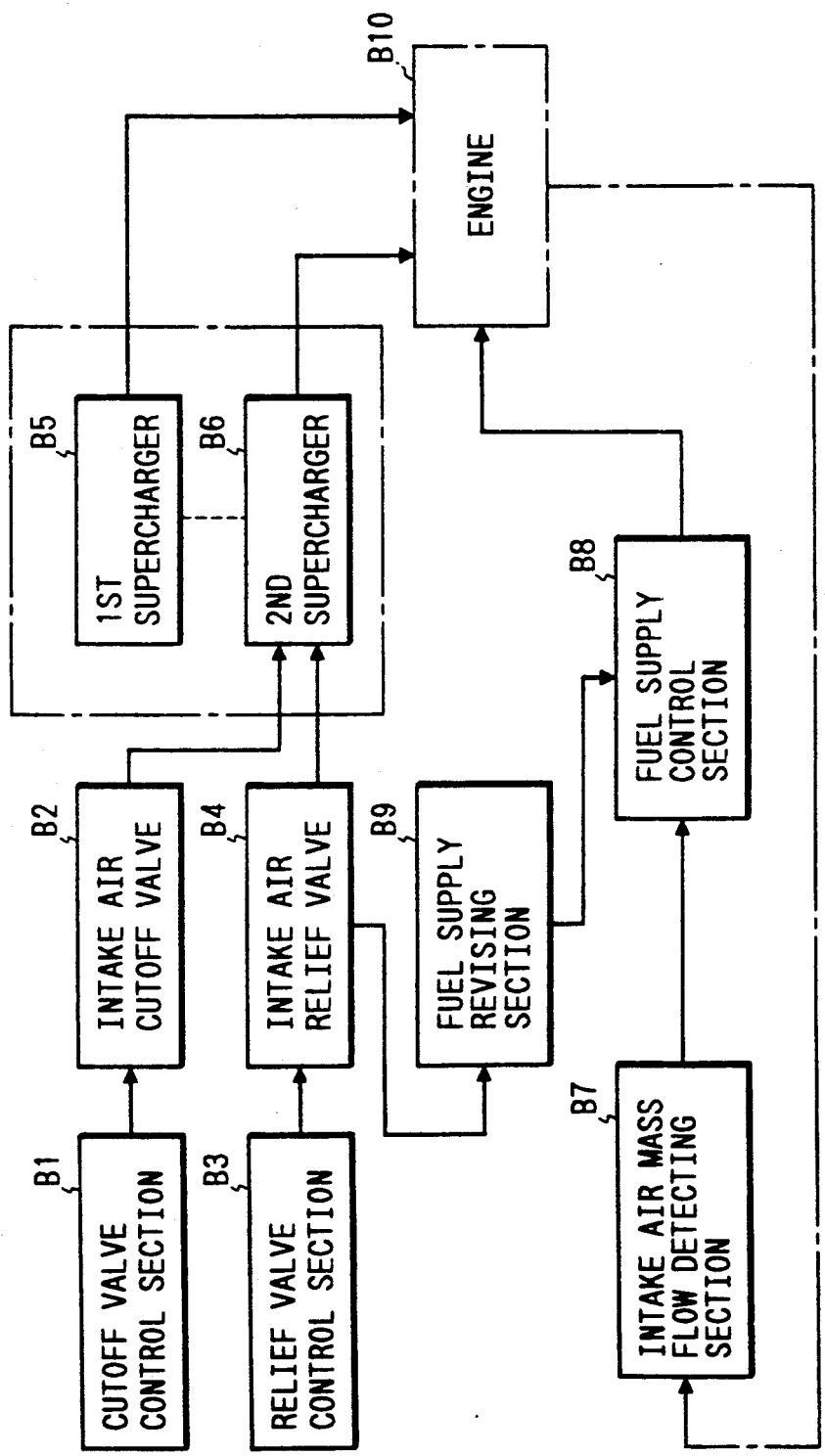
FIG. 1 is a block diagram illustrating the basic arrangement of an air and fuel supply control system for an internal combustion engine according to the present invention.

FIG. 1 illustrates a functional block diagram of a system incorporating the present invention. In the functional block diagram of FIG. 1, the system comprises a cutoff valve control section B1, an intake air cutoff valve B2, a relief valve control section B3, an intake air relief valve B4, a first supercharger B5, a second supercharger B6, an intake air mass flow detecting section B7, a fuel supply control section B8 and a fuel supply revising section B9 and the first and second superchargers B5 and B6 are connected with an engine B10 to which the system is applied.

The second supercharger B6 is constituted as a turbosupercharger having a turbine disposed in one of separated exhaust passage extending from the engine B10 and a compressor disposed in one of separated intake passages connected with the engine B10. The intake air cutoff valve B2 is operative selectively to be open and closed respectively for opening and closing the separated intake passage in which the compressor of the second supercharger B6 is disposed. The cutoff valve control section B1 is operative to cause the intake air cutoff valve B2 to be closed so that the second supercharger B6 is restrained from supercharging the engine B10 when intake air mass flow fed to the engine B10 is to be relatively small and to cause the intake air cutoff valve B2 to be open so that the second supercharger B6 works for supercharging the engine B10 when the intake air mass flow fed to the engine B10 is to be relatively large.

The intake air relief valve B4 is operative selectively to be open and closed respectively for opening and closing a relief passage provided to the separated intake passage in which the compressor of the second supercharger B6 is disposed so as to detour the compressor of the second supercharger B6. The relief valve control section B3 is operative to cause the intake air relief valve B4 to be closed from open before the intake air cutoff valve B2 is caused to be open from closed and to be open from closed after the intake air cutoff valve B2 is caused to be closed from open.

The intake air mass flow detecting section B7 is operative to detect intake air mass flow passing through an intake passage from which the separated intake passages are branched. The fuel supply control section B8 is operative to control quantity of fuel supplied to the engine B10 in accordance with a detection output obtained from the intake air mass flow detecting section B7. The fuel supply revising section B9 is operative to revise the quantity of fuel supplied to the engine B10, which is controlled by the fuel supply control section B8, when the intake air relief valve B4 is caused to be open and closed selectively.

Figure 2:
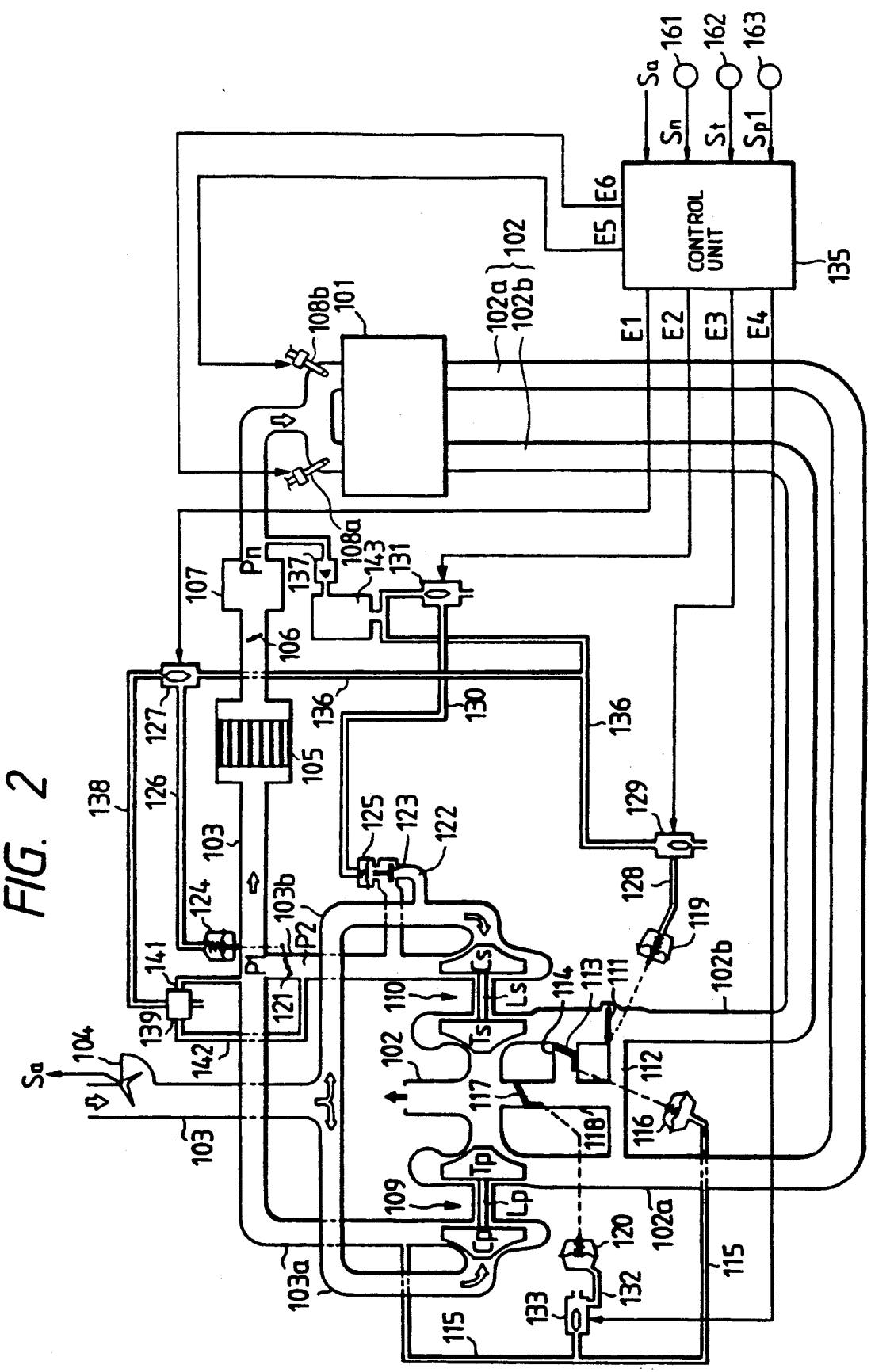
FIG. 2 is a schematic illustration showing an embodiment of air and fuel supply control system for an internal combustion engine according to the present invention, together with essential parts of an engine to which the embodiment is applied.

FIG. 2 illustrates an embodiment of air and fuel supply control system according to the present invention, together with a part of an engine to which the embodiment is applied.

Referring to FIG. 2, an internal combustion engine 101, which is, for example, a rotary engine having a couple of rotors each forming an operating chamber having the capacity of, for example, 654 cubic centimeters, is provided with an exhaust passage 102 for discharging exhaust gas from the engine 101 and an intake passage 103 for supplying the engine 101 with intake air. The exhaust passage 102 includes first and second separated exhaust passages 102a and 102b, and the intake passage 103 includes first and second branched intake passages 103a and 103b which are separated from each other at a location downstream to an air flow sensor 104 provided for detecting intake air mass flow in the intake passage 103 and merged into each other at a location upstream to an intercooler 105 provided for cooling the intake air in the intake passage 103. A portion of the intake passage 103 downstream to the intercooler 105 is provided with a throttle valve 106, a surge chamber 107 and fuel injectors 108a and 108b.

A primary turbosupercharger 109 is provided with a turbine Tp disposed in the first separated exhaust passage 102a to be driven to rotate by the exhaust gas and a compressor Cp disposed in the first branched intake passage 103a and coupled through a rotating shaft Lp with the turbine Tp. A secondary turbosupercharger 110 is also provided with a turbine Ts disposed in the second separated exhaust passage 102b to be driven to rotate by the exhaust gas and a compressor Cs disposed in the second branched intake passage 103b and coupled through a rotating shaft Ls with the turbine Ts.

A portion of the first branched intake passage 103a upstream to the compressor Cp and a portion of the second branched intake passage 103b upstream to the compressor Cs are arranged in a line to form a branched portion, so that pressure waves produced in one of the first and second branched intake passages 103a and 103b propagates easily to the other of the first and second branched intake passages 103a and 103b but hardly toward the air flow sensor 104.

An exhaust cutoff valve 111 is disposed in a portion of the second separated exhaust passage 102b upstream to the turbine Ts. This exhaust cutoff valve 111 is operative to close the second separated exhaust passage 102b in order to prevent the exhaust gas from being supplied to the turbine Ts so that only the primary turbosupercharger 109 works in a situation where intake air mass flow supplied to the engine 101 is to be relatively small.

A portion of the second separated exhaust passage 102b upstream to the exhaust cutoff valve 111 is connected through a connecting passage 112 with a portion of the first separated exhaust passage 102a upstream to the turbine Tp. The connecting passage 112 is also connected with a portion of the exhaust passage 102 downstream to the turbines Tp and Ts through a bypass passage 118 in which a waste gate valve 117 is provided. The bypass passage 118 forms, together with the connecting passage 112, a partial exhaust passage detouring the turbines Tp and Ts of the primary and secondary turbosuperchargers 109 and 110. A portion of the bypass passage 118 upstream to the waste gate valve 117 is connected with a portion of the second separated exhaust passage 102b between the exhaust cutoff valve 111 and the turbine Ts through an exhaust snifting passage 114 in which an exhaust snifting valve 113 is provided. The exhaust snifting passage 114 forms, together with portions of the connecting passage 112 and bypass passage 118, a partial exhaust passage detouring the exhaust cutoff valve 111.

The waste gate valve 117 is driven by a diaphragm actuator 120 and a pressure chamber of the diaphragm actuator 120 is coupled, through a control pressure pipe 132, a three-way solenoid valve 133 having its output port connected to the control pressure pipe 132 and a control pressure pipe 115 to which one of input ports of the three-way solenoid valve 133 is connected, with a portion of the first branched intake passage 103a downstream to the compressor Cp. The exhaust snifting valve 113 is driven by a diaphragm actuator 116 and a pressure chamber of the diaphragm actuator 116 is coupled through the control pressure pipe 115 with the portion of the first branched intake passage 103a downstream to the compressor Cp.

An intake air cutoff valve 121 is disposed in a portion of the second branched intake passage 103b downstream to the compressor Cs. The second branched intake passage 103b is provided also with an intake air relief passage 122 detouring the turbine Ts and having therein an intake air relief valve 123. The intake air cutoff valve 121 is driven by a diaphragm actuator 124, and the intake air relief valve 123 is driven by a diaphragm actuator 125.

A control pressure pipe 126 extending from the diaphragm actuator 124 for driving the intake air cutoff valve 121 is connected with an output port of a three-way solenoid valve 127, and a control pressure pipe 128 extending from a diaphragm actuator 119 for driving the exhaust cutoff valve 111 is connected with an output port of a three-way solenoid valve 129. Further, a control pressure pipe 130 extending from the diaphragm actuator 125 for driving the intake air relief valve 123 is connected with an output port of a three-way solenoid valve 131.

The above mentioned three-way solenoid valves 127, 129, 131 and 133 are controlled by a control unit 135 constituted by a microcomputer.

The control unit 135 is provided with detection output signals Sa, Sn, St and Spl obtained from the air flow sensor 104, an engine speed sensor 161 for detecting the engine speed, a throttle sensor 162 for detecting opening degree of the throttle valve 106 (opening degree of throttle), and an air pressure sensor 163 for detecting air pressure P1 at a position downstream to the compressor Cp in the first branched intake passage 103a, that is, compressed air pressure applied to the engine 101, respectively, and operative to produce control signals E1 to E4 selectively based on the detection output signals Sa, Sn, St and Spl and to supply the three-way solenoid valve 127 with the control signal E1, the three-way solenoid valve 131 with the control signal E2, the three-way solenoid valve 129 with the control signal E3, and the three-way solenoid valve 133 with the control signal E4.

One of input ports of the three-way solenoid valve 129 is open to the atmosphere and the other of the input ports is connected through a pipe 136 with a negative pressure tank 143 to which negative pressure Pn at a portion downstream to the throttle valve 106 in the intake passage 103 is supplied through a check valve 137. One of input ports of the three-way solenoid valve 131 is open to the atmosphere and the other of the input ports is connected with the negative pressure tank 143. Further, one of input ports of the three-way solenoid valve 127 is connected through the pipe 136 with the negative pressure tank 143 and the other of the input ports is connected through a pipe 138 with a pressure difference detecting valve 139.

Figure 3:
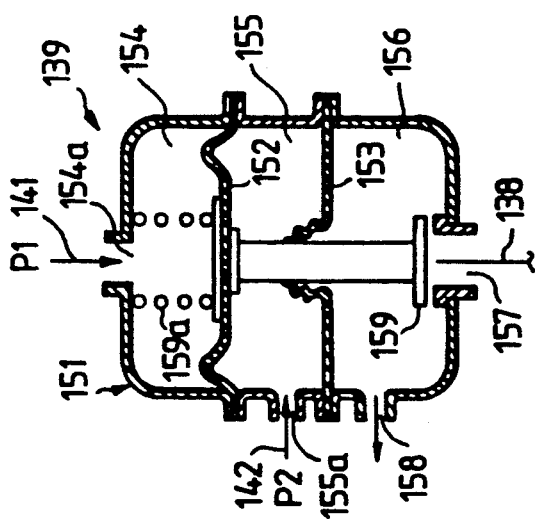
FIG. 3 is a schematic illustration showing a pressure difference detecting valve employed in the embodiment shown in FIG. 2.

As shown in FIG. 3, the pressure difference detecting valve 139 has a housing 151 in which three chambers 154, 155 and 156 are formed with diaphragms 152 and 153. The chambers 154 and 155 are provided with input ports 154a and 155a, respectively, and the chamber 156 is provided with an open port 158 and an output port 157 connected with the pipe 138. The input port 154a is connected through a pipe 141 with the portion of the first branched intake passage 103a downstream to the compressor Cp so as to be supplied with the air pressure P1, and the input port 155a is connected through a pipe 142 with a portion of the second branched intake passage 103b upstream to the intake air cutoff valve 121 so as to be supplied with air pressure P2 at a position upstream to the intake air cutoff valve 121 in the second branched intake passage 103b.

The pressure difference detecting valve 139 is provided further with a valve body 159 connected with the diaphragms 152 and 153 and biased by a spring 159a disposed in the chamber 154. This valve body 159 is operative to keep the output port 157 open so as to open the chamber 156 to the atmosphere when a pressure difference between the air pressures P1 and P2 is relatively large and keep the output port 157 closed when the pressure difference between the air pressures P1 and P2 is equal to or smaller than a predetermined pressure value $\Delta P$. Accordingly, when the control pressure pipe 126 is communicated with the pipe 138 through the three-way solenoid valve 127 controlled by the control signal E1 and the pressure difference between the air pressures P1 and P2 is larger than the predetermined pressure value $\Delta P$, the diaphragm actuator 124 is opened to the atmosphere and thereby the intake air cutoff valve 121 is opened. On the other hand, when the control pressure pipe 126 is communicated with the pipe 136 through the three-way solenoid valve 127 controlled by the control signal E1, the negative pressure is applied to the diaphragm actuator 124 and thereby the intake air cutoff valve 121 is closed.

When the control pressure pipe 128 is communicated with the pipe 136 through the three-way solenoid valve 129 controlled by the control signal E3, the negative pressure is applied to the diaphragm actuator 119 and thereby the exhaust cutoff valve 111 is closed, so that only the primary turbosupercharger 109 is caused to work. On the other hand, when the control pressure pipe 128 is opened to the atmosphere through the three-way solenoid valve 129 controlled by the control signal E3, the exhaust cutoff valve 111 is opened, so that the secondary turbosupercharger 110 is caused to work in addition to the primary turbosupercharger 109.

Figure 4:
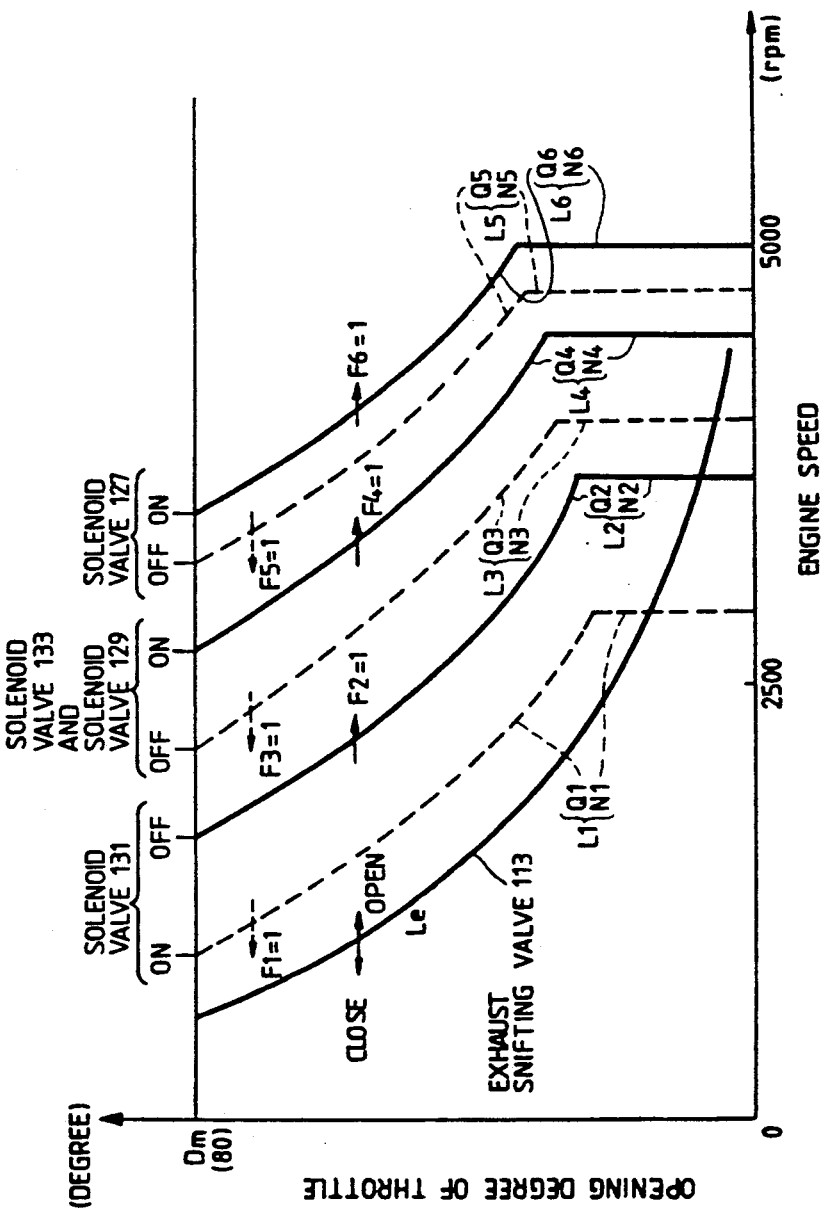
FIG. 4 is a characteristic chart used for explaining the operation of various valves employed in the embodiment shown in FIG. 2.

FIG. 4 is a characteristic chart showing the operating conditions of the three-way solenoid valve 127 operative to actuate the intake air cutoff valve 121, the three-way solenoid valve 129 operative to actuate the exhaust cutoff valve 111, the three-way solenoid valve 131 operative to actuate the intake air relief valve 123, and the three-way solenoid valve 133 operative to actuate the exhaust snifting valve 113 and the waste gate valve 117. This characteristic chart of FIG. 4 has an axis of abscissa representing engine speed and an axis of ordinate representing engine load embodied by opening degree of throttle, the maximum value of which is indicated by Dm, and is stored in the form of data map in a memory contained in the control unit 135.

According to the characteristic chart of FIG. 4, the exhaust snifting valve 113 is changed to be open from closed and to be closed from open in accordance with a line Le in common. On the other hand, the three-way solenoid valve 131 is changed into the ON state from the OFF state for causing the intake air relief valve 123 to be open from closed in accordance with a line L1 which indicates the operating condition of engine in which the engine 101 operates with intake air mass flow Q1 and the operating condition of engine in which the engine 101 operates at engine speed N1 and into the OFF state from the ON state for causing the intake air relief valve 123 to be closed from open in accordance with a line L2 which indicates the operating condition of engine in which the engine 101 operates with intake air mass flow Q2 and the operating condition of engine in which the engine 101 operates at engine speed N2, the three-way solenoid valves 129 and 133 are changed into the OFF state from the ON state for causing respectively the exhaust cutoff valve 111 and waste gate valve 117 to be closed from open in accordance with a line L3 which indicates the operating condition of engine in which the engine 101 operates with intake air mass flow Q3 and the operating condition of engine in which the engine 101 operates at engine speed N3 and into the ON state from the OFF state for causing respectively the exhaust cutoff valve 111 and waste gate valve 117 to be open from closed in accordance with a line L4 which indicates the operating condition of engine in which the engine 101 operates with intake air mass flow Q4 and the operating condition of engine in which the engine 101 operates at engine speed N4, and the three-way solenoid valve 127 is changed into the OFF state from the ON state for causing the intake air cutoff valve 121 to be closed from open in accordance with a line L5 which indicates the operating condition of engine in which the engine 101 operates with intake air mass flow Q5 and the operating condition of engine in which the engine 101 operates at engine speed N5 and into the ON state from the OFF state for causing the intake air cutoff valve 121 to be open from closed in accordance with a line L6 which indicates the operating condition of engine in which the engine 101 operates with intake air mass flow Q6 and the operating condition of engine in which the engine 101 operates at engine speed N6.

On the characteristic chart of FIG. 4, an operating area having the line L4 as a lower boundary is set to correspond to the operating condition of the engine 101 in which intake air mass flow fed to the combustion chambers formed in the engine 101 is to be relatively large, and each of an operating area between the lines L2 and L4, and operating area having the line L2 as an upper boundary is set to correspond to the operating condition of the engine 101 in which intake air mass flow fed to the combustion chambers formed in the engine 101 is to be relatively small.

When the operating condition of the engine 101 resides in the operating area having the line L2 as an upper boundary, the control unit 135 is operative to keep each of the exhaust cutoff valves 111 and the intake air cutoff valve 121 closed and, contrary, the intake air relief valve 123 open, so that only the primary turbosupercharger 109 is caused to work for supercharging the engine 101. Then, when the intake air mass flow fed to the engine 101 has increased to cross the line L2 and the operating condition of the engine 101 has moved into the operating area between the lines L2 and L4, the control unit 135 is operative to close the intake air relief valve 123. In process of this, before the intake air relief valve 123 is closed, the exhaust snifting valve 113 is opened when the intake air mass flow fed to the engine 101 has increased to cross the line Le and thereby the exhaust gas is supplied slightly to the turbine Ts of the secondary turbosupercharger 110 through the exhaust snifting passage 114 under a condition in which the intake air relief valve 123 is open. This results in that the turbine Ts is driven to rotate by the exhaust gas flowing through the exhaust snifting passage 114 so that the secondary turbosupercharger 110 is subjected to its preliminary rotation before the exhaust cutoff valve 111 is opened.

After that, when the intake air mass flow in the engine 101 has further increased to cross the line L4 and the operating condition of the engine 101 has moved into the operating area between the lines L4 and L6, the control unit 135 is operative to open the exhaust cutoff valve 111, and then, when the intake air mass flow fed to the engine 101 has still further increased to cross the line L6 and the operating condition of the engine 101 has moved into the operating area having the line L6 as a lower boundary, the control unit 135 is operative to open the intake air cutoff valve 121, so that the turbine Tp of the primary turbosupercharger 109 and the turbine Ts of the secondary turbosupercharger 110 are driven to rotate by the exhaust gas passing through the first and second separated exhaust passages 102a and 102b respectively and thereby both the primary and secondary turbosuperchargers 109 and 110 are caused to work for supercharging the engine 101.

As described above, since the secondary turbosupercharger 110 is rotated preliminarily by the exhaust gas supplied thereto through the exhaust snifting valve 113 under the condition in which the intake air relief valve 123 is open before it commences to work for supercharging the engine 101 and the intake air relief valve 123 is closed before the exhaust cutoff valve 111 is opened, the secondary turbosupercharger 110 under the sufficiently high preliminary rotation commences to work for supercharging the engine 101, and consequently, the response in supercharging by the secondary turbosupercharger 110 is improved and torque shock arising on the engine 101 is surely suppressed when the secondary turbosupercharger 110 commences to work for supercharging the engine 101.

The control unit 135 is also operative to supply the three-way solenoid valve 133 with the control signal E4 so as to cause the three-way solenoid valve 133 to supply the diaphragm actuator 120 with the air pressure P1 obtained through the control pressure pipe 115 when the exhaust cutoff valve 111 is opened. Therefore, under a condition in which the operating condition of the engine 101 resides in the operating area having the line L6 as the lower boundary and therefore both the primary and secondary turbosuperchargers 109 and 110 work simultaneously for supercharging the engine 101, when the air pressure P1, that is, the compressed air pressure applied to the engine 101 reaches a predetermined value, the waste gate valve 117 is opened by the diaphragm valve 120 to cause a part of exhaust gas flowing through the first and second separated exhaust passages 102a and 102b to pass through the bypass passage 118 without passing through the turbines Tp and Ts of the primary and secondary turbosuperchargers 109 and 110 for preventing the compressed air pressure applied to the engine 101 from exceeding the predetermined value. That is, the waste gate valve 117 is operative to limit the compresses air pressure applied to the engine 101 to the predetermined value when both the primary and secondary turbosuperchargers 109 and 110 work for supercharging the engine 101.

On the other hand, under a condition in which only the primary turbosupercharger 109 works for supercharging the engine 101 and therefore the waste gate valve 117 is kept closed, when the intake air mass flow fed to the engine 101 has increased to cross the line Le shown in FIG. 4 and the air pressure P1 has reached the predetermined value, the exhaust snifting valve 113 is opened to cause the secondary turbosupercharger 110 to be subjected to its preliminary rotation. During the preliminary rotation of the secondary turbosupercharger 110, the compressed air pressure applied to the engine 101 is prevented from increasing substantially by the intake air relief passage 122 and the intake air relief valve 123 operative to open and close the intake air relief passage 122. That is, the intake air relief passage 122 and the intake air relief valve 123 work for making supercharging by the secondary turbosupercharger 110 substantially ineffective during the preliminary rotation of the secondary turbosupercharger 110. Accordingly, the exhaust snifting valve 113 functions to limit the compressed air pressure applied to the engine 101 to the predetermined value when only the primary turbosupercharger 109 works for supercharging the engine 101.

The control unit 135 produces also control signals E5 and E6 and supplies the fuel injector 108a with the control signal E5 for controlling quantity of fuel injected from the fuel injector 108a to the engine 101 and the fuel injector 108b with the control signal E6 for controlling quantity of fuel injected from the fuel injector 108b to the engine 101 in accordance with a fuel supply control described later in detail. The quantity of fuel injected from each of the fuel injectors 108a and 108b is basically determined on the strength of the detection output signal Sa from the air flow sensor 104 so as to be in proportion to the intake air mass flow detected by the air flow sensor 104.

One example of an operation program for controlling the three-way solenoid valves 127, 129, 131 and 133 for actuating the intake air cutoff valve 121, exhaust cutoff valve 111, intake air relief valve 123 and waste gate valve 117, respectively, is carried out in the control unit 135 in accordance with a flow chart shown in FIGS. 5-a, 5-b and 5-c.

According to the flow chart shown in FIGS. 5-a, 5-b and 5-c, first, in step 171, an initial arrangement for setting a flag Fl to be 1 and setting each of flags F2 to F6 to be 0 is conducted. As shown in FIG. 4, after the initial arrangement, the flag Fl is set to be 1 and each of the flags F2 to F6 is set to be 0 when the intake air mass flow or the engine speed is decreased to cross the line L1 the flag F2 is set to be 1 and each of the flags F1 and F3 to F6 is set to be 0 when the intake air mass flow or the engine speed is increased to cross the line L2, the flag F3 is set to be 1 and each of the flags F1, F2 and F4 to F6 is set to be 0 when the intake air mass flow or the engine speed is decreased to cross the line L3, the flag F4 is set to be 1 and each of the flags F1 to F3, F5 and F6 is set to be 0 when the intake air mass flow or the engine speed is increased to cross the line L4, the flag F5 is set to be 1 and each of the flags F1 to F4 and F6 is set to be 0 when the intake air mass flow or the engine speed is decreased to cross the line L5, and the flag F6 is set to be 1 and each of the flags F1 to F5 is set to be 0 when the intake air mass flow or the engine speed is increased to cross the line L6.

Then, in step 172, the detection output signals Sa, Sn, St and Spl obtained from the sensors 104, 161, 162 and 163 are stored. Further, the intake air mass flow Q1 and the engine speed N1 representing the line L1, the intake air mass flow Q2 and the engine speed N2 representing the line L2, the intake air mass flow Q3 and the engine speed N3 representing the line L3, the intake air mass flow Q4 and the engine speed N4 representing the line L4, the intake air mass flow Q5 and the engine speed N5 representing the line L5, and the intake air mass flow Q6 and the engine speed N6 representing the line L6 are stored, in step 173.

After that, in step 176, it is checked whether the flag F1 is 1 or not. When the flag F1 is 1, it is checked whether the intake air mass flow Q is larger then the intake air mass flow Q2 or not, in step 177. If the intake air mass flow Q is equal to or smaller than the intake air mass flow Q2, it is checked whether engine speed N represented by the detection output signal Sn is higher than the engine speed N2 or not, in step 178.

When it is clarified in the step 177 that the intake air mass flow Q is larger than the intake air mass flow Q2 or it is clarified in the step 178 that the engine sped N is higher than the engine speed N2, the flag F2 is set to be 1 in step 179, and the control signal E2 is supplied to the three-way solenoid valve 131 so that the three-way solenoid valve 131 is put in the OFF state for causing the intake air relief valve 123 to be closed and a valve flag FR is set to be 0, in step 180, then the process returns to the step 172. On the other hand, the engine speed N is equal to or lower than the engine speed N2 as a result of the check in the step 178, the process returns to the step 172 directly from the step 178.

If it is clarified in the step 176 that the flag F1 is 0, it is checked whether the flag F2, F4 or F6 is 1 or not in step 181. When the flag F2, F4 or F6 is 1, it is further checked whether the flag F2 is 1 or not in step 182. Then, if the flag F2 is 1, it is checked whether the intake air mass flow Q is larger then the intake air mass flow Q4 or not, in step 183. If the intake air mass flow Q is equal to or smaller than the intake air mass flow Q4, it is checked whether the engine speed N is higher than the engine speed N4 or not, in step 184.

When it is clarified in the step 183 that the intake air mass flow Q is larger than the intake air mass flow Q4 or it is clarified in the step 184 that the engine speed N is higher than the engine speed N4, the flag F4 is set to be 1 in step 185, and the control signals E3 and E4 are supplied to the three-way solenoid valves 129 and 133 respectively so that the three-way solenoid valves 129 and 133 are put in the ON state for causing respectively the exhaust cutoff valve 111 and waste gate valve 117 to be open, in step 186, then the process returns to the step 172.

On the other hand, the engine speed N is equal to or lower than the engine speed N4 as a result of the check in the step 184, it is checked whether the intake air mass flow Q is smaller than the intake air mass flow Q1 or not, in step 187. If the intake air mass flow Q is smaller than the intake air mass flow Q1, it is further checked that the engine speed N is lower than the engine speed N1 or not, in step 188. When it is clarified in the step 187 that the intake air mass flow Q is equal to or larger than the intake air mass flow Q1 or it is clarified in the step 188 that the engine speed N is equal to or higher than the engine speed N1, the process returns to the step 172. On the other hand, if the engine speed N is lower than the engine speed N1 as a result of the check in the step 188, the flag F1 is set to be 1 in step 189, and the control signal E2 is supplied to the three-way solenoid valve 131 so that the three-way solenoid valve 131 is put in the ON state for causing the intake air relief valve 123 to be open and the valve flag FR is set to be 1, in step 190, then the process returns to the step 172.

When it is clarified in the step 182 that the flag F2 is 0, it is checked whether the flag F4 is 1 or not in step 191. Then, if the flag F4 is 1, it is checked it is checked whether the intake air mass flow Q is larger then the intake air mass flow Q6 or not, in step 192. If the intake air mass flow Q is equal to or smaller than the intake air mass flow Q6, it is checked whether the engine speed N is higher than the engine speed N6 or not, in step 193.

When it is clarified in the step 192 that the intake air mass flow Q is larger than the intake air mass flow Q6 or it is clarified in the step 193 that the engine speed N is higher than the engine speed N6, the flag F6 is set to be 1 in step 194, and the control signal El is supplied to the three-way solenoid valve 127 so that the three-way solenoid valve 127 is put in the ON state for causing the intake air cutoff valve 121 to be open and a valve flag FC is set to be 1, in step 195, then the process returns to the step 172. To the contrary, the engine speed N is equal to or lower than the engine speed N6 as a result of the check in the step 193, it is checked whether the intake air mass flow Q is smaller than the intake air mass flow Q3 or not, in step 196. If the intake air mass flow Q is smaller than the intake air mass flow Q3, it is further checked that the engine speed N is lower than the engine speed N3 or not, in step 197. When it is clarified in the step 196 that the intake air mass flow Q is equal to or larger than the intake air mass flow Q3 or it is clarified in the step 197 that the engine speed N is equal to or higher than the engine speed N3, the process returns to the step 172.

On the other hand, if the engine speed N is lower than the engine speed N3 as a result of the check in the step 197, the flag F3 is set to be 1 in step 198, and the control signals E3 and E4 are supplied to the three-way solenoid valves 129 and 133 respectively so that the three-way solenoid valves 129 and 133 are put in the OFF state for causing respectively the exhaust cutoff valve 111 and waste gate valve 117 to be closed, in step 199, then the process returns to the step 172.

If it is clarified in the step 191 that the flag F4 is 0, it is checked whether the intake air mass flow Q is smaller than the intake air mass flow Q5 or not, in step 200. If the intake air mass flow Q is smaller than the intake air mass flow Q5, it is further checked that the engine speed N is lower than the engine speed N5 or not, in step 201. When it is clarified in the step 200 that the intake air mass flow Q is equal to or larger than the intake air mass flow Q5 or it is clarified in the step 201 that the engine speed N is equal to or higher than the engine speed N5, the process returns to the step 172. On the other hand, the engine speed N is lower than the engine speed N5 as a result of the check in the step 201, the flag F5 is set to be 1 in step 202, and the control signal El is supplied to the three-way solenoid valve 127 so that the three-way solenoid valve 127 is put in the OFF state for causing the intake air cutoff valve 121 to be closed and the valve flag FC is set to be 0, in step 203, then the process returns to the step 172.

Further, when it is clarified in the step 181 that none of the flags F2, F4 and F6 is 1, it is checked whether the flag F3 is 1 or not in step 204. Then, if the flag F3 is 1, it is checked whether the intake air mass flow Q is smaller than the intake air mass flow Q1 or not, in step 205. If the intake air mass flow Q is smaller than the intake air mass flow Q1, it is further checked that the engine speed N is lower than the engine speed N1 or not, in step 206. If the engine speed N is lower than the engine speed N1 as a result of the check in the step 206, the flag F1 is set to be 1 in step 207, and the control signal E2 is supplied to the three-way solenoid valve 131 so that the three-way solenoid valve 131 is put in the ON state for causing the intake air relief valve 123 to be open and the valve flag FR is set to be 1, in step 208, then the process returns to the step 172.

When it is clarified in the step 205 that the intake air mass flow Q is equal to or larger than the intake air mass flow Q1 or it is clarified in the step 206 that the engine speed N is equal to or higher than the engine speed N1, it is checked whether the intake air mass flow Q is larger then the intake air mass flow Q4 or not, in step 209. If the intake air mass flow Q is equal to or smaller than the intake air mass flow Q4, it is checked whether the engine speed N is higher than the engine speed N4 or not, in step 210.

If the engine speed N is equal to or lower than the engine speed N4 as a result of the check in the step 210, the process returns to the step 172. On the other hand, if it is clarified in the step 209 that the intake air mass flow Q is larger than the intake air mass flow Q4 or it is clarified in the step 210 that the engine speed N is higher than the engine speed N4, the flag F4 is set to be 1 in step 211, and the control signals E3 and E4 are supplied to the three-way solenoid valves 129 and 133 respectively so that the three-way solenoid valves 129 and 133 are put in the ON state for causing respectively the exhaust cutoff valve 111 and waste gate valve 117 to be open, in step 212, then the process returns to the step 172.

When it is clarified in the step 204 that the flag F3 is 0, it is checked whether the intake air mass flow Q is smaller than the intake air mass flow Q3 or not, in step 213. If the intake air mass flow Q is smaller than the intake air mass flow Q3, it is further checked that the engine speed N is lower than the engine speed N3 or not, in step 214. If the engine speed N is lower than the engine speed N3 as a result of the check in the step 214, the flag F3 is set to be 1 in step 215, and the control signals E3 and E4 are supplied to the three-way solenoid valves 129 and 133 respectively so that the three-way solenoid valves 129 and 133 are put in the OFF state for causing respectively the exhaust cutoff valve 111 and waste gate valve 117 to be closed, in step 216, then the process returns to the step 172.

When it is clarified in the step 213 that the intake air mass flow Q is equal to or larger than the intake air mass flow Q3 or it is clarified in the step 214 that the engine speed N is equal to or higher than the engine speed N3, it is checked whether the intake air mass flow Q is larger then the intake air mass flow Q6 or not, in step 217. If the intake air mass flow Q is equal to or smaller than the intake air mass flow Q6, it is checked whether the engine speed N is higher than the engine speed N6 or not, in step 218.

If the engine speed N is equal to or lower than the engine speed N6 as a result of the check in the step 218, the process returns to the step 172. On the other hand, if it is clarified in the step 217 that the intake air mass flow Q is larger than the intake air mass flow Q6 or it is clarified in the step 218 that the engine sped N is higher than the engine speed N6, the flag F6 is set to be 1 in step 219, and the control signal El is supplied to the three-way solenoid valve 127 so that the three-way solenoid valve 127 is put in the ON state for causing the intake air cutoff valve 121 to be open and the valve flag FC is set to be 1, in step 220, then the process returns to the step 172.

Under a condition in which the primary and secondary turbosuperchargers 109 and 110 are sequentially controlled to work for supercharging the engine 101 as described above, in the case where the throttle valve 106 disposed in the intake passage 103 is controlled, for example, to be fully open from half-open, then kept fully open during a period of time To and fully closed after the period of time To, as shown in FIG. 6A, air flow at the air flow sensor 104 increases linearly in general during the period of time To and then decreases linearly in general after the period of time To in such a manner as shown in FIG. 6B when the engine 101 operates at a relatively low speed and in such a manner as shown in FIG. 6D when the engine 101 operates at a relatively high speed.

With the air flow at the air flow sensor 104 increasing as described above during the period of time To, first the intake air relief valve 123 is caused to be closed from open as shown in FIG. 6G, then the exhaust cutoff valve 111 is caused to be open from closed as shown in FIG. 6F, and finally the intake air cutoff valve 121 is caused to be closed from open as shown in FIG. 6H. Further, with the air flow at the air flow sensor 104 decreasing as described above after the period of time To, first the intake air cutoff valve 121 is caused to be closed from open as shown in FIG. 6H, then the exhaust cutoff valve 111 is caused to be closed from open as shown in FIG. 6F, and finally the intake air relief valve 123 is caused to be open from closed as shown in FIG. 6G.

When the intake air relief valve 123 is caused to be closed from open in the period of time To as shown in FIG. 6G, the intake air relief passage 122 is closed so that air flow which circulates from a location downstream to the compressor Cs in the second branched intake passage 103b through the intake air relief passage 122 to a location upstream to the compressor Cs in the second branched intake passage 103b decreases and therefore air flow which enters into the second branched intake passage 103b after having passed through the air flow sensor 104 increases. Accordingly, as indicated with an arrow a1 in FIG. 6B or an arrow a3 in FIG. 6D, the air flow at the air flow sensor 104 increases to be larger than air flow practically fed to the engine 101 as indicated with an broken line in each of FIGS. 6B and 6D, and this results in that the quantity of fuel injected from each of the fuel injectors 108a and 108b, which is basically determined so as to be in proportion to the intake air mass flow detected by the air flow sensor 104, is increased when the intake air relief valve 123 is caused to be closed from open.

On the other hand, when the intake air relief valve 123 is caused to be open from closed after the period of time To as shown in FIG. 6G, the intake air relief passage 122 is opened so that intake air having stayed at the location downstream to the compressor Cs in the second branched intake passage 103b flows through the intake air relief passage 122 to the location upstream to the compressor Cs in the second branched intake passage 103b and therefore the air flow which enters into the second branched intake passage 103b after having passed through the air flow sensor 104 decreases. Accordingly, as indicated with an arrow b1 in FIG. 6B or an arrow b3 in FIG. 6D, the air flow at the air flow sensor 104 decreases to be smaller than the air flow practically fed to the engine 101 as indicated with an broken line in each of FIGS. 6B and 6D, and this results in that the quantity of fuel injected from each of the fuel injectors 108a and 108b is decreased when the intake air relief valve 123 is caused to be open from closed.

Further, when the intake air cutoff valve 121 is caused to be open from closed in the period of time To as shown in FIG. 6H, intake air having stayed at the location downstream to the compressor Cs of the secondary turbosupercharger 110 in the second branched intake passage 103b is suddenly forwarded toward the engine 101, together with intake air compressed by the compressor Cp of the primary turbosupercharger 109 in the first branched intake passage 103a. Accordingly, the air flow practically fed to the engine 101, which is shown by a broken line indicated with an arrow c1 in FIG. 6B or with an arrow c3 in FIG. 6D, increases to be larger than the air flow at the air flow sensor 104 shown in each of FIGS. 6B and 6D, ands this results in that the quantity of fuel injected from each of the fuel injectors 108a and 108b is deficient in relation to the air flow practically fed to the engine 101 when the intake air cutoff valve 121 is caused to be open from closed.

On the other hand, when the intake air cutoff valve 121 is caused to be closed from open after the period of time To as shown in FIG. 6H, a part of the intake air having passed through the air flow sensor 104 is prevented from being forwarded toward the engine 101 by the intake air cutoff valve 121 so as to stay at the location downstream to the compressor Cs of the secondary turbosupercharger 110 in the second branched intake passage 103b. Accordingly, the air flow practically fed to the engine 101, which is shown by a broken line indicated with an arrow d1 in FIG. 6B or with an arrow d3 in FIG. 6D, decreases to be smaller than the air flow at the air flow sensor 104 shown in each of FIGS. 6B and 6D, ands this results in that the quantity of fuel injected from each of the fuel injectors 108a and 108b is in excess in relation to the air flow practically fed to the engine 101 when the intake air cutoff valve 121 is caused to be closed from open.

In view of these facts, the control unit 135 is operative to revise the control signals E5 and E6 which are supplied to the fuel injectors 108a and 108b, respectively, so that the fuel supply control in which such fuel revision as shown in FIG. 6C is made when the engine 101 operates at the relatively low speed and such fuel revision as shown in FIG. 6E is made when the engine 101 operates at the relatively high speed is carried out.

According to the fuel revisions shown in FIGS. 6C and 6D, the quantity of fuel injected from each of the fuel injectors 108a and 108b is reduced for a relatively short period of time in such a manner as indicated with an arrow a2 in FIG. 6C or with an arrow a4 in FIG. 6E when the intake air relief valve 123 is caused to be closed from open and increased for a relatively short period of time in such a manner as indicated with an arrow b2 in FIG. 6C or with an arrow b4 in FIG. 6E when the intake air relief valve 123 is caused to be open from closed. Further, the quantity of fuel injected from each of the fuel injectors 108a and 108b is increased for a relatively short period of time in such a manner as indicated with an arrow c2 in FIG. 6C or with an arrow c4 in FIG. 6E when the intake air cutoff valve 121 is caused to be open from closed and reduced for a relatively short period of time in such a manner as indicated with an arrow d2 in FIG. 6C or with an arrow d4 in FIG. 6E when the intake air cutoff valve 121 is caused to be closed from open.

One example of an operation program for the fuel supply control is carried out in the control unit 135 in accordance with a flow chart shown in FIG. 7.

According to the flow chart shown in FIG. 7, first, in step 61, an initial arrangement is conducted, and in step 62, the detection output signals Sa and Sn obtained from the air flow sensor 104 and the engine speed sensor 161 are stored. Then, in step 63, fundamental quantity of fuel Jo is calculated based on the detection output signals Sa and Sn, and in step 64, final quantity of fuel J is calculated in accordance with the equation: $J=Jo(1+Ko+Kr+Kc)$, where Ko represents a revision factor concerning various operating conditions of the engine 101, Kr represents a revision factor concerning the condition of the intake air relief valve 123 and Kc represents a revision factor concerning the condition of the intake air cutoff valve 121. After that, in step 65, it is checked whether it is in fuel injection timing just at that moment or not. If it is in fuel injection timing, the control signals E5 and E6 which are so formed as to cause the fuel injectors 108a and 108b to carry out fuel injection of the final quantity of fuel J calculated in the step 64 are sent out to the fuel injectors 108a and 108b, respectively, in step 66, and the process returns to the step 62. On the other hand, If it is clarified in the step 65 that it is not in fuel injection timing, the process returns to the step 62 directly from the step 65.

Figure 8:
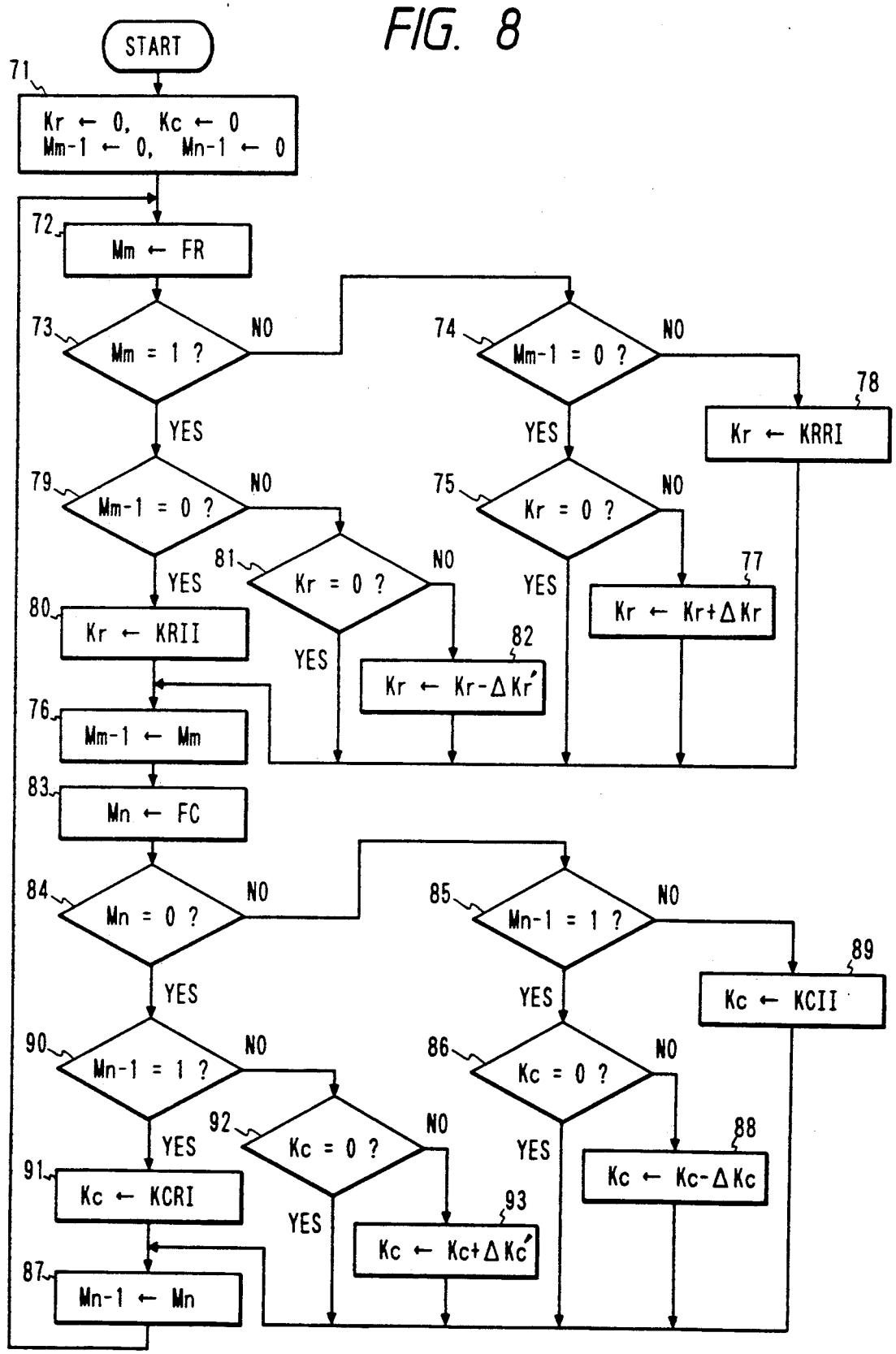

One example of an operation program for determining the revision factors Kr and Kc which are used for calculating the final quantity of fuel J in the operation program for the fuel supply control as explained above is carried out also in the control unit 135 in accordance with a flow chart shown in FIG. 8.

According to the flow chart shown in FIG. 8, first, in step 71, an initial arrangement for setting each of the revision factors Kr and Kc to be 0 and setting each of stored data Mm-1 and Mn-1 to be 0 is conducted. Next, in step 72, the valve flag FR, which is set to be 1 when the three-way solenoid valve 131 is put in the ON state for causing the intake air relief valve 123 to be open and set to be 0 when the three-way solenoid valve 131 is put in the OFF state for causing the intake air relief valve 123 to be closed in the operation program carried out in accordance with the flow chart shown in FIGS. 5-a to 5-c, is stored to turn into stored data Mm.

Then, in step 73, it is checked whether the stored data Mm represent 1 or not. When the stored data Mm do not represent 1 but represent 0, it is further checked whether the stored data Mm-1 represent 0 or not, in step 74. If the stored data Mm-1 represent 0, it is checked whether the revision factor Kr is 0 or not, in step 75. If it is clarified in the step 75 that the revision factor Kr is 0, the process advances to step 76. On the other hand, if it is clarified in the step 75 that the revision factor Kr is not 0, the revision factor Kr is revised by adding thereto a predetermined revising value ΔKr, in step 77, and then the process advances to the step 76. Further, if it is clarified in the step 74 that the stored data Mm-1 do not represent 0 but represent 1, the revision factor Kr is set to have a predetermined initially reduced value KRRI, in step 78, and then the process advances to the step 76.

When it is clarified in the step 73 that the stored data Mm represent 1, it is checked whether the stored data Mm-1 represent 0 or not, in step 79. If the stored data Mm-1 represent 0, the revision factor Kr is set to have a predetermined initially increased value KRII, in step 80, and then the process advances to the step 76. To the contrary, if the stored data Mm-1 do not represent 0 but represent 1, it is checked whether the revision factor Kr is 0 or not, in step 81. If it is clarified in the step 81 that the revision factor Kr is 0, the process advances to the step 76. On the other hand, if it is clarified in the step 81 that the revision factor Kr is not 0, the revision factor Kr is revised by subtracting therefrom a predetermined revising value ΔKr', in step 82, and then the process advances to the step 76.

In the step 76, the stored data Mm is stored to turn into stored data Mm-1. After that, in step 83, the valve flag FC, which is set to be 1 when the three-way solenoid valve 127 is put in the ON state for causing the intake air cutoff valve 121 to be open and set to be 0 when the three-way solenoid valve 127 is put in the OFF state for causing the intake air cutoff valve 121 to be closed in the operation program carried out in accordance with the flow chart shown in FIGS. 5-a to 5-c, is stored to turn into stored data Mn.

Then, in step 84, it is checked whether the stored data Mn represent 0 or not. When the stored data Mn do not represent 0 but represent 1, it is further checked whether the stored data Mn-1 represent 1 or not, in step 85. If the stored data Mn-1 represent 1, it is checked whether the revision factor Kc is 0 or not, in step 86. If it is clarified in the step 86 that the revision factor Kc is 0, the process advances to step 87. On the other hand, if it is clarified in the step 86 that the revision factor Kc is not 0, the revision factor Kc is revised by subtracting therefrom a predetermined revising value ΔKc, in step 88, and then the process advances to the step 87. Further, if it is clarified in the step 85 that the stored data Mn-1 do not represent 1 but represent 0, the revision factor Kc is set to have a predetermined initially increased value KCII, in step 89, and then the process advances to the step 87.

When it is clarified in the step 84 that the stored data Mn represent 0, it is checked whether the stored data Mn-1 represent 1 or not, in step 90. If the stored data Mn-1 represent 1, the revision factor Kc is set to have a predetermined initially reduced value KCRI, in step 91, and then the process advances to the step 87. To the contrary, if the stored data Mn-1 do not represent 1 but represent 0, it is checked whether the revision factor Kc is 0 or not, in step 92. If it is clarified in the step 92 that the revision factor Kc is 0, the process advances to step 87. On the other hand, if it is clarified in the step 92 that the revision factor Kc is not 0, the revision factor Kc is revised by adding thereto a predetermined revising value ΔKc', in step 93, and then the process advances to the step 87.

In the step 87, the stored data Mn is stored to turn into stored data Mn-1, and after that the process returns to the step 72.

In the embodiment shown in FIG. 2, it is possible to use a supercharger other than a turbosupercharger in place of the primary turbosupercharger 109.

What is claimed is:

1. An air and fuel supply control system for an internal combustion engine, the system comprising:
a plurality of superchargers including at least a first supercharger and a second supercharger which is constituted as a turbosupercharger having a turbine disposed in one of separated exhaust passages extending from the engine and a compressor disposed in one of separated intake passages connected with the engine,
an intake air cutoff valve for selectively opening and closing the separated intake passage in which the compressor of said second supercharger is disposed,
an intake air relief valve for selectively opening and closing a relief passage provided to the separated intake passage in which the compressor of said second supercharger is disposed so as to detour the compressor of said second supercharger, a cutoff valve controlling means for causing said intake air cutoff valve to be closed so that said first supercharger works for supercharging the engine but said second supercharger is restrained from supercharging the engine when intake air mass flow fed to the engine is relatively small and causing said intake air cutoff valve to be open so that both of said first and second superchargers work for supercharging the engine when the intake air mass flow fed to the engine is relatively large, relief valve controlling means for causing said intake air relief valve to be closed before said intake air cutoff valve is opened and to be opened after said air cutoff valve is closed, intake air mass flow detecting means disposed in an intake passage from which separated intake passages are branched for detecting intake air mass flow passing through said intake passage, a relief valve state determining control which determines when said relief valve is selectively opened or closed, fuel supply control means for determining a quantity of fuel to be supplied to the engine, wherein said quantity of fuel is determined on the basis of a detection output obtained from said intake air mass flow detecting means, and fuel supply revising means for revising said quantity of fuel determined by the fuel supply control means on the basis of the output from the intake air mass flow detecting means, wherein said revising means revises said quantity in response to the state of the relief valve determined by the relief valve state determining control to revise said quantity of fuel during a predetermined period of time after the relief valve is opened or closed so that the quantity of fuel supplied to the engine is reduced during a relatively short period of time after the intake air relief valve is closed and the quantity of fuel supplied to the engine is increased during a relatively short period of time after the intake air relief valve is opened.

2. An air and fuel supply control system according to claim 1, wherein said fuel supply control means is operative to increase the quantity of fuel supplied to the engine when the intake air mass flow detected by said intake air mass flow detecting means increases and to reduce the quantity of fuel supplied to the engine when the intake air mass flow detected by said intake air mass flow detecting means decreases.

3. An air and fuel supply control system according to claim 2, wherein said fuel supply revising means is operative to reduce the quantity of fuel supplied to the engine, which is varied to be increased and reduced selectively by said fuel supply control means, when said intake air relief valve is caused to be closed.

4. An air and fuel supply control system according to claim 2, wherein said fuel supply revising means is operative to increase the quantity of fuel supplied to the engine, which is varied to be increased and reduced selectively by said fuel supply control means, when said intake air cutoff valve is caused to be open.

5. An air and fuel supply control system according to claim 2, wherein said fuel supply revising means is operative to reduce the quantity of fuel supplied to the engine, which is varied to be increased and reduced selectively by said fuel supply control means, during a first predetermined period of time when said intake air relief valve is caused to be closed and to increase the quantity of fuel supplied to the engine, which is varied to be increased and reduced selectively by said fuel supply control means, during a second predetermined period of time when said intake air relief valve is caused to be open.

6. An air and fuel supply control system according to claim 1, wherein said first supercharger is constituted as a turbosupercharger having a turbine disposed in another of the separated exhaust passages and a compressor disposed in another of the separated intake passages.

7. An air and fuel supply control system according to claim 6, wherein said relief valve control means is operative to detect one of predetermined operation areas of the engine provided by operating characteristics of a memory device in which an actual operating condition of the engine resides and to control said intake air relief valve in accordance with the detected operating area.

8. An air and fuel supply control system according to claim 7, wherein said operating characteristics present the operating areas on a coordinate plane defined by coordinate axes representing respectively engine speed and engine load.

9. An air and fuel supply control system according to claim 8, wherein said engine load defining the coordinate plane shown by said operating characteristics is embodied by the intake air mass flow detected by said intake air mass flow detecting means.

* * * * *